(12) United States Patent
Joseph et al.

(10) Patent No.: US 10,180,266 B2
(45) Date of Patent: Jan. 15, 2019

(54) EXPANSION RACK FOR COMPRESSOR MOUNTING

(71) Applicant: Heatcraft Refrigeration Products LLC, Stone Mountain, GA (US)

(72) Inventors: Poly Joseph, Chennai (IN); Abdul Kader Peer Mohideen, Chennai (IN); Ganesh Thokur, Chennai (IN)

(73) Assignee: Heatcraft Refrigeration Products LLC, Richardson, TX (US)

(*) Notice: Subject to any disclaimer, the term of this patent is extended or adjusted under 35 U.S.C. 154(b) by 316 days.

(21) Appl. No.: 15/053,206

(22) Filed: Feb. 25, 2016

(65) Prior Publication Data
US 2017/0248342 A1    Aug. 31, 2017

(51) Int. Cl.
*F24F 13/32* (2006.01)
*F16M 5/00* (2006.01)
*F24F 13/20* (2006.01)
*F24F 1/10* (2011.01)

(52) U.S. Cl.
CPC .............. *F24F 13/32* (2013.01); *F16M 5/00* (2013.01); *F24F 1/10* (2013.01); *F24F 13/20* (2013.01); *F16M 2200/08* (2013.01); *F24F 2013/202* (2013.01)

(58) Field of Classification Search
CPC ....... F16M 5/00; F16M 2200/08; F24F 13/32; F24F 1/10; F24F 1/12
USPC ............ 248/672, 673, 678, 639, 638, 346.5
See application file for complete search history.

(56) References Cited

U.S. PATENT DOCUMENTS

| 1,656,810 | A | * | 1/1928 | Arnstein | B64C 1/065 52/634 |
| 2,323,153 | A | * | 6/1943 | Pilson | H02K 5/00 248/222.51 |
| 2,660,117 | A | * | 11/1953 | Maunder | B41F 27/04 101/407.1 |
| 3,019,866 | A | * | 2/1962 | Grabowski | A47B 96/1408 403/4 |

(Continued)

FOREIGN PATENT DOCUMENTS

| CN | 202429537 U | 9/2012 |
| CN | 203005018 U | 6/2013 |

(Continued)

OTHER PUBLICATIONS

Extended European Search Report for Application No./Patent No. 17157975.8-1602/3225933, dated Sep. 6, 2017.

*Primary Examiner* — Michael Safavi
(74) *Attorney, Agent, or Firm* — Baker Botts L.L.P.

(57) ABSTRACT

An apparatus includes a first metal beam and a mounting bracket. The first metal beam is arranged in a linearly horizontal direction and defines a plurality of first and second cavities along a top surface of the first metal beam. Each first cavity is of a first shape and is separated from another first cavity by a first distance. Each second cavity is of a second shape different from the first shape and is separated from another second cavity by a second distance greater than the first distance. The mounting bracket couples to the top surface of the first metal beam at a first mounting cavity of the plurality of second cavities and the top surface of the second metal beam at a second mounting cavity of the plurality of fourth cavities. The mounting bracket further couples to a compressor.

18 Claims, 5 Drawing Sheets

(56) References Cited

U.S. PATENT DOCUMENTS

| | | | | |
|---|---|---|---|---|
| 3,321,168 A * | 5/1967 | Entremont | H01F 27/06 | 248/346.5 |
| 3,324,524 A * | 6/1967 | Perron | F27D 5/0018 | 248/346.5 |
| 3,890,755 A * | 6/1975 | Specht | B65G 21/06 | 193/35 R |
| 5,010,709 A * | 4/1991 | Paz | E04C 3/005 | 403/205 |
| 5,157,883 A * | 10/1992 | Meyer | E04B 2/766 | 24/460 |
| 5,527,625 A * | 6/1996 | Bodnar | E04C 3/065 | 428/595 |
| 5,626,231 A * | 5/1997 | Kwong | B65D 19/14 | 108/54.1 |
| 6,095,482 A * | 8/2000 | LaGrotta | H02B 1/50 | 108/51.11 |
| 6,740,851 B2 * | 5/2004 | Woodlief | B05C 11/10 | 219/421 |
| 7,042,710 B1 | 5/2006 | Beseth | | |
| 7,976,111 B2 * | 7/2011 | Sans Rovira | D06F 39/12 | 248/678 |
| 8,225,581 B2 * | 7/2012 | Strickland | E04C 3/07 | 52/481.1 |
| 2008/0265125 A1 * | 10/2008 | Ye | G06F 1/187 | 248/672 |
| 2010/0315775 A1 | 12/2010 | Grantham | | |
| 2011/0005257 A1 | 1/2011 | Crow | | |
| 2012/0292479 A1 * | 11/2012 | Chen | G06F 1/183 | 248/672 |
| 2014/0027604 A1 * | 1/2014 | Gong | H05K 7/20172 | 248/672 |
| 2014/0048678 A1 * | 2/2014 | Chen | F16M 7/00 | 248/678 |

FOREIGN PATENT DOCUMENTS

| | | |
|---|---|---|
| CN | 203857235 U | 10/2014 |
| JP | H09250781 A | 9/1997 |
| JP | 2010025415 A | 2/2010 |
| WO | WO 2015/074933 A1 | 5/2015 |

* cited by examiner

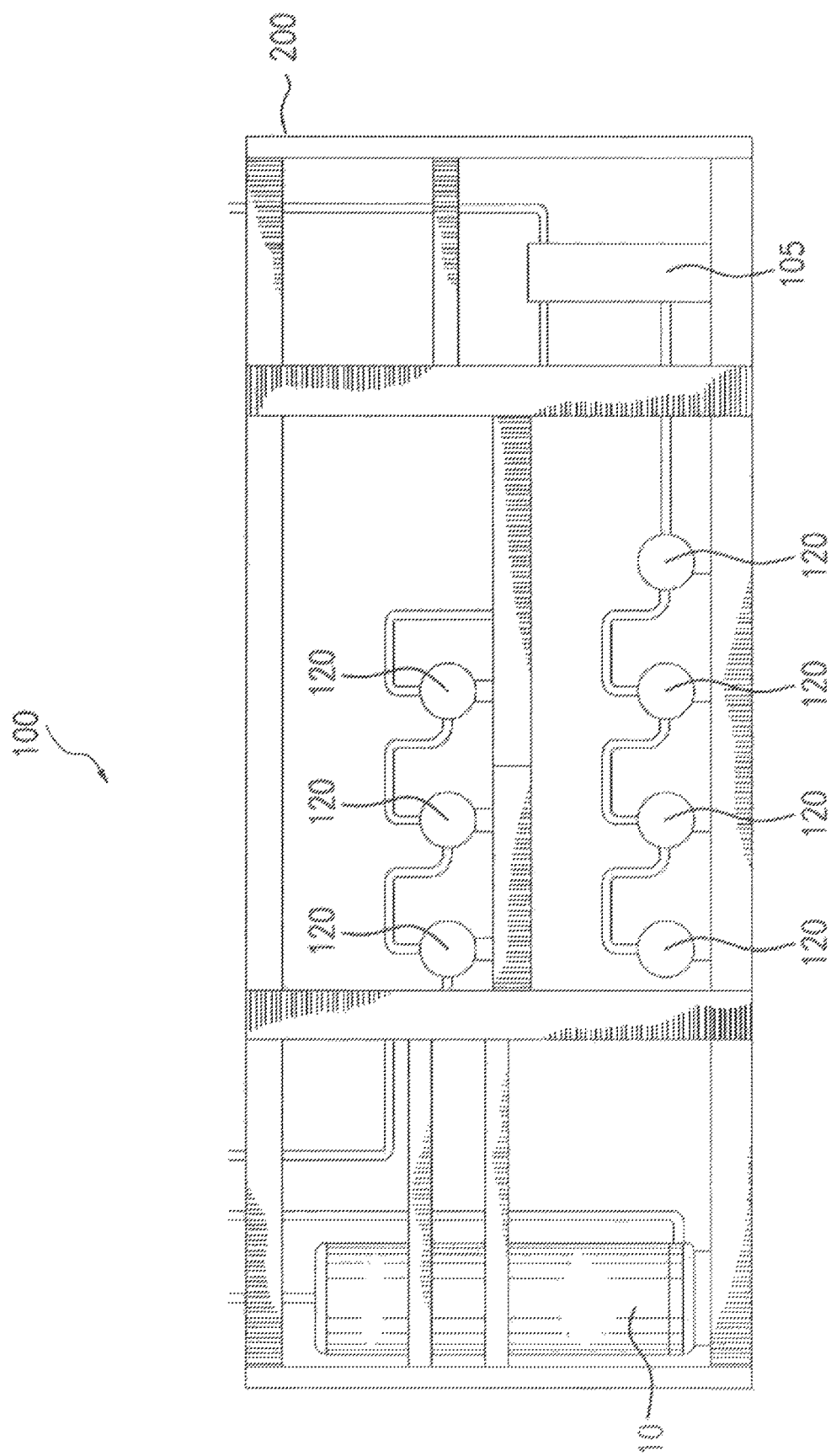

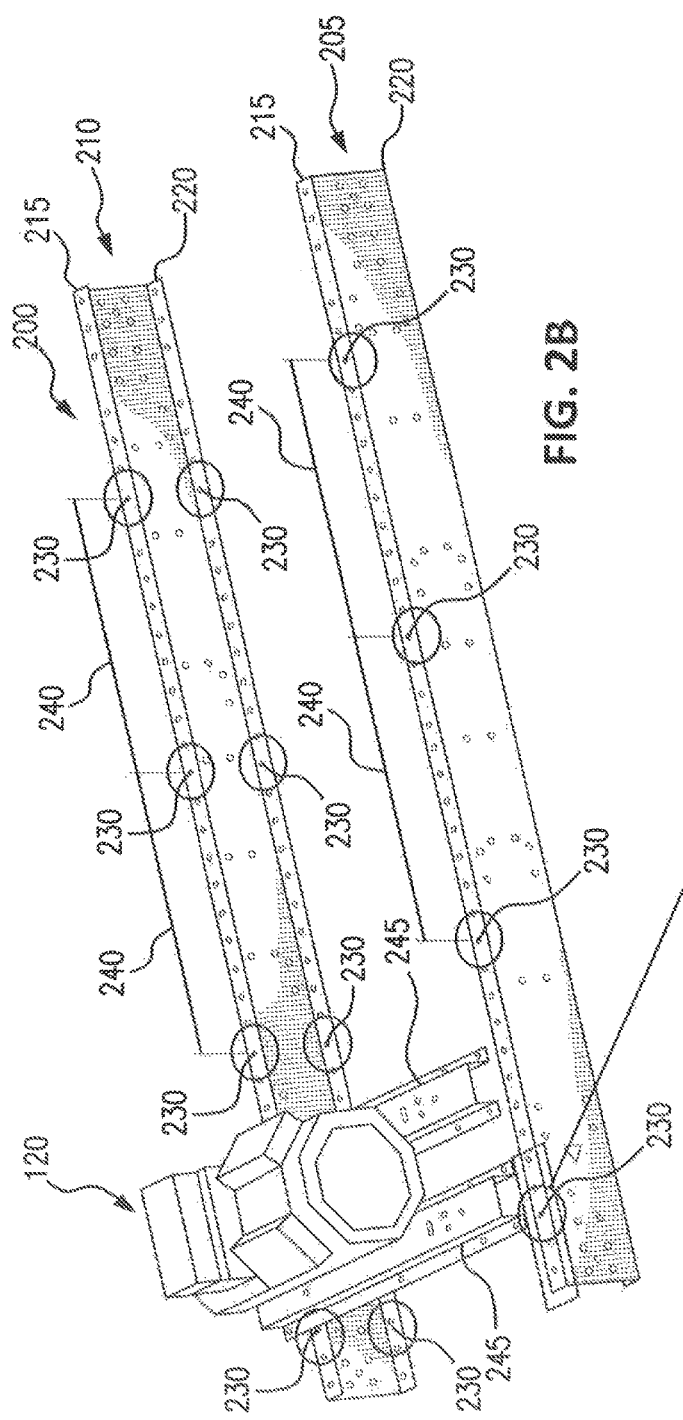
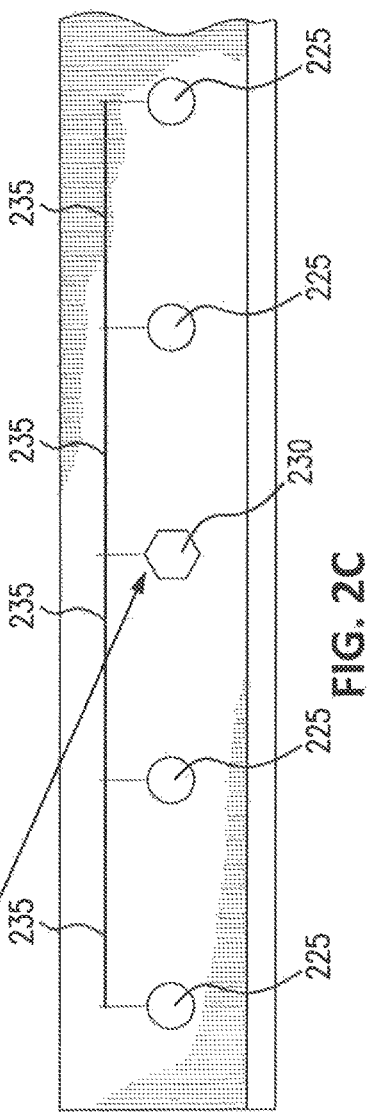
FIG. 2B
FIG. 2C

EXPANSION RACK FOR COMPRESSOR MOUNTING

TECHNICAL FIELD

This disclosure relates generally to a rack for a climate control system, specifically a rack for compressor mounting.

BACKGROUND

Climate control systems are often arranged on metal racks. For example, a metal rack can be configured to accommodate a high side heat exchanger, a flash tank, a compressor, etc. The racks can be manufactured in various sizes to accommodate any number of components of the climate control systems.

SUMMARY OF THE DISCLOSURE

According to one embodiment, an apparatus includes a first metal beam, a second metal beam, and a mounting bracket. The first and second metal beams are arranged in a linearly horizontal direction. The first metal beam defines a plurality of first and second cavities along a top surface of the first metal beam. Each first cavity is of a first shape and is separated from another first cavity by a first distance. Each second cavity is of a second shape different from the first shape and is separated from another second cavity by a second distance greater than the first distance. The second metal beam defines a plurality of third and fourth cavities along a top surface of the second metal beam. Each third cavity is of the first shape and is separated from another third cavity by the first distance. Each fourth cavity is of the second shape and is separated from another fourth cavity by the second distance. The mounting bracket couples to the top surface of the first metal beam at a first mounting cavity of the plurality of second cavities and the top surface of the second metal beam at a second mounting cavity of the plurality of fourth cavities. The mounting bracket further couples to a compressor.

According to another embodiment, a method includes arranging a first metal beam in a linearly horizontal direction. The first metal beam defines a plurality of first and second cavities along a top surface of the first metal beam. Each first cavity is of a first shape and is separated from another first cavity by a first distance. Each second cavity is of a second shape different from the first shape and is separated from another second cavity by a second distance greater than the first distance. The method further includes arranging a second metal beam in a linearly horizontal direction. The second metal beam defines a plurality of third and fourth cavities along a top surface of the second metal beam. Each third cavity is of the first shape and is separated from another third cavity by the first distance. Each fourth cavity is of the second shape and is separated from another fourth cavity by the second distance. The method also includes coupling a mounting bracket to the top surface of the first metal beam at a first mounting cavity of the plurality of second cavities and the top surface of the second metal beam at a second mounting cavity of the plurality of fourth cavities. The mounting bracket further couples to a compressor.

According to yet another embodiment, an apparatus includes a first metal beam and a mounting bracket. The first metal beam is arranged in a linearly horizontal direction and defines a plurality of first and second cavities along a top surface of the first metal beam. Each first cavity is of a first shape and is separated from another first cavity by a first distance. Each second cavity is of a second shape different from the first shape and is separated from another second cavity by a second distance greater than the first distance. The mounting bracket couples to the top surface of the first metal beam at a first mounting cavity of the plurality of second cavities and the top surface of the second metal beam at a second mounting cavity of the plurality of fourth cavities. The mounting bracket further couples to a compressor.

Certain embodiments may provide one or more technical advantages. For example, an embodiment allows for compressors of various sizes, types, and/or manufacturers to be mounted to a rack. As another example, an embodiment allows for a rack to be expanded to accommodate additional compressors. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
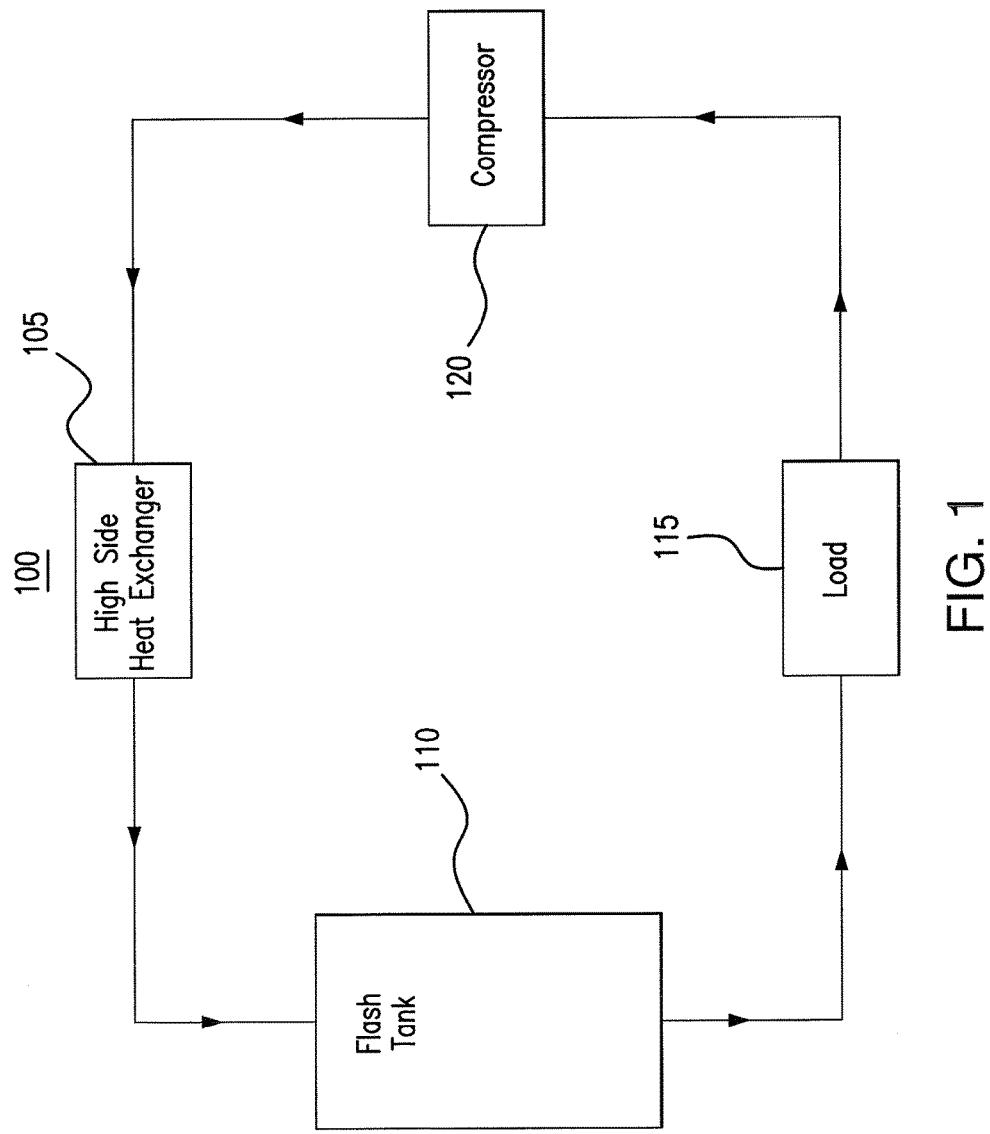
FIG. 1 illustrates an example climate control system.
Figure 2D:
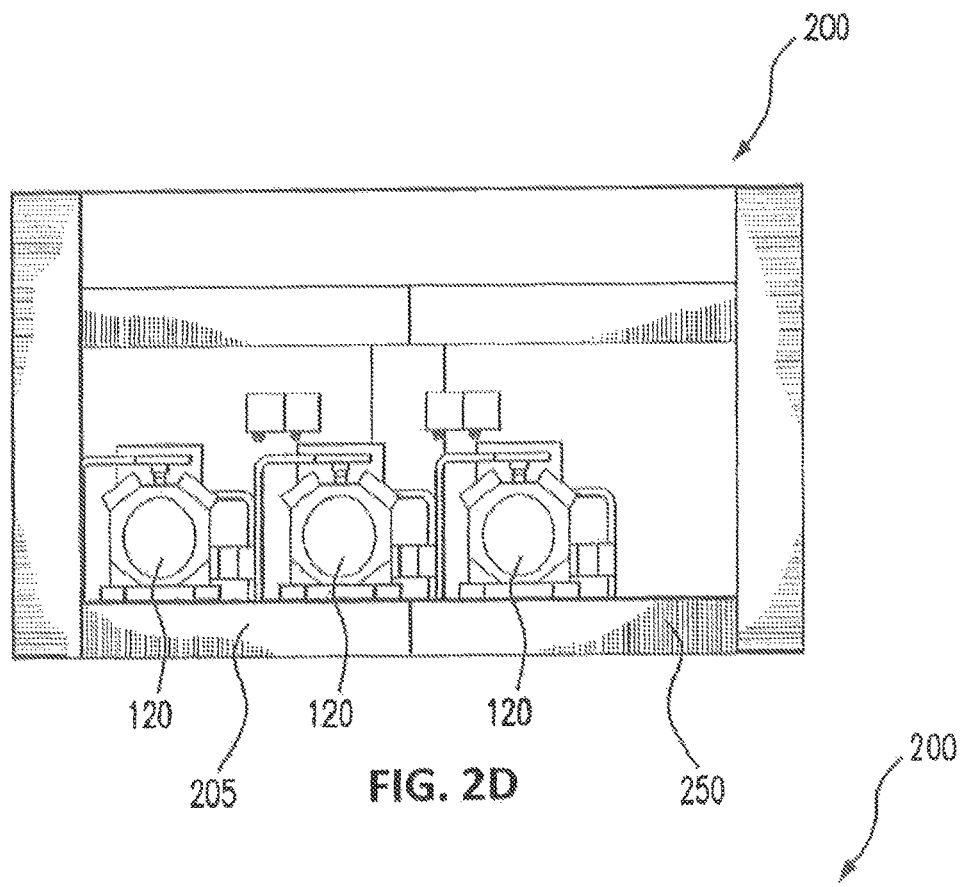
FIG. 2A illustrates a frontal view of the example climate control system of FIG. 1 arranged in a rack.
FIG. 2B illustrates a portion of the rack of FIG. 2A for mounting compressors.
FIG. 2C illustrates a portion of the rack of FIG. 2A for mounting compressors.
Figure 2E:
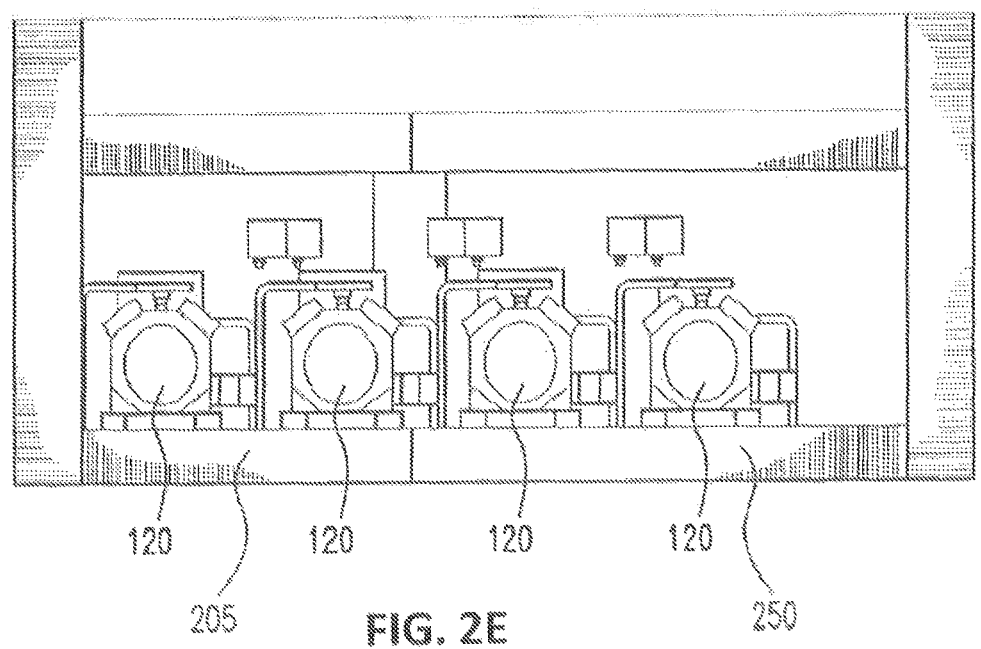
Figure 3:
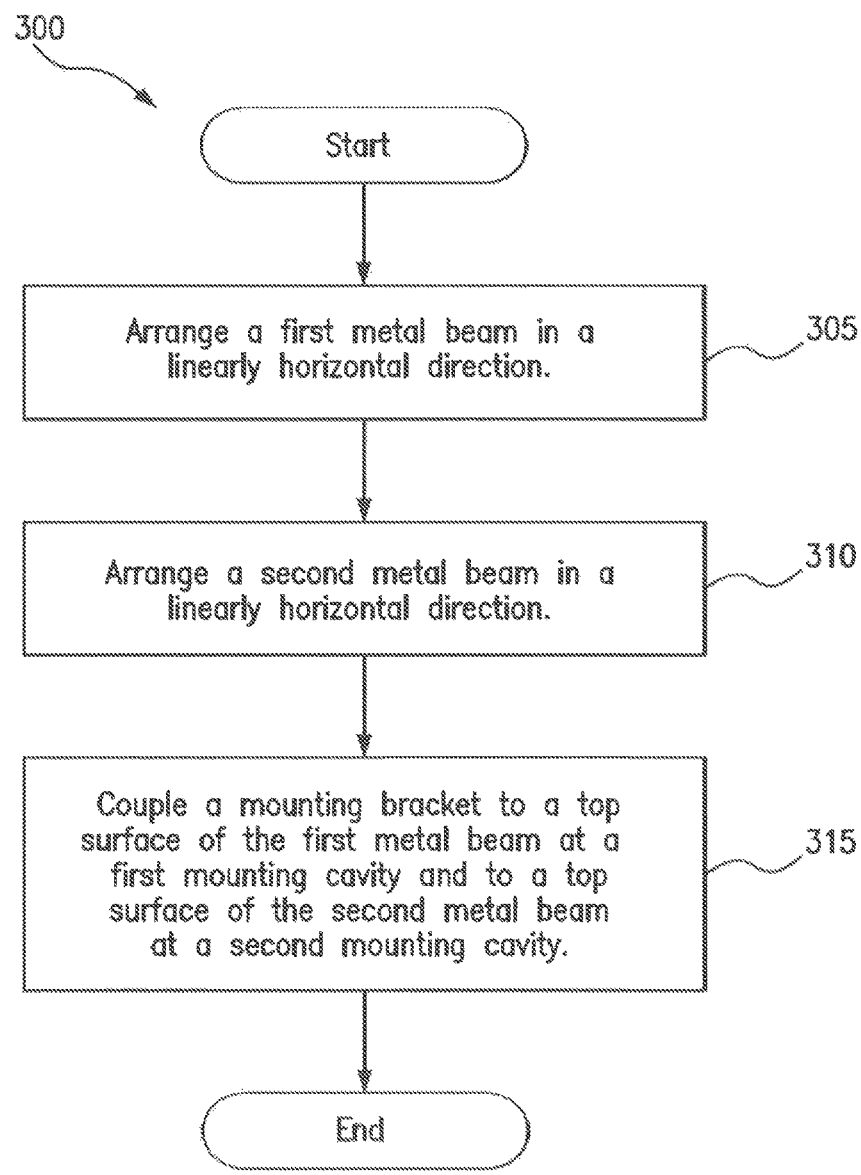
FIG. 3 is a flowchart illustrating a method of mounting a compressor to the rack of FIG. 2A.

Embodiments of the present disclosure and its advantages are best understood by referring to FIGS. 1 through 3 of the drawings, like numerals being used for like and corresponding parts of the various drawings.

Climate control systems are often arranged on metal racks. For example, a metal rack can be configured to accommodate a high side heat exchanger, a flash tank, a compressor and other various components of a climate control system. The rack can be manufactured in various sizes to accommodate any number of components of the climate control system. The components of the climate control system can then be mounted onto the metal rack. The metal rack can then be placed in a closet or room where the climate control system is stored.

The metal rack is typically manufactured to accommodate the particular needs of a climate control system. For example, if a climate control system utilizes only two compressors, then the metal rack can be manufactured with enough space for two compressors. As another example, if a climate control system utilizes six compressors, then the metal rack can be manufactured with enough space to accommodate six compressors. As yet another example, if a climate control system utilizes two flash tanks, then the rack can be manufactured to accommodate two flash tanks. Therefore, the metal racks can be manufactured to suit the needs of any climate control system.

This type of manufacture of metal racks presents a challenge when the climate control system needs to be modified. In such instances, the manufactured rack may no longer be suitable for the modified climate control system. As a result, a new rack may need to be manufactured to accommodate the modified climate control system. For example, if compressors need to be added to an existing climate control system, the metal rack for that climate control system may not be large enough to accommodate the additional compressors. As a result, a new, larger rack may need to be manufactured to accommodate the modified climate control system.

This disclosure contemplates a climate control system arranged in a modular metal rack that allows for portions of the climate control system to be modified without having to remanufacture the entire metal rack. Specifically, the metal rack sections off the portion of the climate control system that utilizes compressors. That section of the metal rack can be expanded and/or modified without affecting the configuration of the other sections of the metal rack. In this manner, the metal rack can be modified to accommodate additional compressors without having to remanufacture the entire rack.

Furthermore, the metal beams used to mount compressors to the rack include two types of holes, one type being of a different shape than the other type. The differently shaped holes can be used to mark the location on the metal beams where compressors should be mounted. Enough space can be provided between the differently shaped holes to ensure that there is sufficient space between mounted compressors. In this manner, compressors of various sizes or various manufactures can be mounted to the metal beams without hindering the mounting of additional compressors. Moreover, the entire metal rack need not be remanufactured to accommodate compressors of different sizes or manufactures.

In particular embodiments, by using the metal rack, compressors can be added to the system without affecting certain portions of the rack. In some embodiments, the rack allows for compressors to be added to the climate control system without needing a new metal rack to be manufactured. The climate control system will be discussed in more detail using FIGS. 1 through 3. FIG. 1 describes the components of the climate control system. FIGS. 2A through 2C describe the configuration of the metal rack for mounting compressors. FIG. 3 describes a method of arranging the metal rack.

FIG. 1 illustrates an example climate control system 100. As illustrated in FIG. 1, system 100 includes a high side heat exchanger 105, a flash tank 110, a load 115, and a compressor 120. The components of system 100 cycle a refrigerant through system 100 to cool a space.

High side heat exchanger 105 removes heat from the refrigerant. When heat is removed from the refrigerant, the refrigerant is cooled. This disclosure contemplates high side heat exchanger 105 being operated as a condenser and/or a gas cooler. When operating as a condenser, high side heat exchanger 105 cools the refrigerant such that the state of the refrigerant changes from a gas to a liquid. When operating as a gas cooler, high side heat exchanger 105 cools the refrigerant but the refrigerant remains a gas. In certain configurations, high side heat exchanger 105 is positioned such that heat removed from the refrigerant may be discharged into the air. For example, high side heat exchanger 105 may be positioned on a rooftop so that heat removed from the refrigerant may be discharged into the air. As another example, high side heat exchanger 105 may be positioned external to a building and/or on the side of a building.

Flash tank 110 stores refrigerant received from high side heat exchanger 105. This disclosure contemplates flash tank 110 storing refrigerant in any state such as, for example, a liquid state and/or a gaseous state. Refrigerant leaving flash tank 110 is fed to load 115. This disclosure contemplates system 100 including any number of flash tanks 110. Flash tank 110 is referred to as a receiving vessel in certain embodiments.

Load 115 receives the refrigerant from flash tank 110. Load 115 cycles the refrigerant to cool a space proximate load 115. For example, load 115 may use the refrigerant to cool air proximate load 115. Then load 115 may circulate the cooled air using a fan to cool a larger space.

Compressor 120 compresses refrigerant received from load 115. This disclosure contemplates system 100 including any number of compressors 120. Compressor 120 may be configured to increase the pressure of the refrigerant. As a result, the heat in the refrigerant may become concentrated and the refrigerant may become a high pressure gas. Compressor 120 may send the compressed refrigerant to high side heat exchanger 105.

This disclosure contemplates climate control system 100 including any number of components. For example, climate control system 100 may include one or more high side heat exchangers 105, flash tanks 110, loads 115, and/or compressors 120. Climate control system 100 may also include piping that controls the flow of the refrigerant through system 100. Climate control system 100 may further include other components typically found in a climate control system such as, for example, a filter dryer, an oil separator, and an accumulator. This disclosure contemplates climate control system 100 including any appropriate component.

FIGS. 2A through 2E illustrate climate control system 100 arranged in a modular metal rack. By arranging climate control system 100 in a modular metal rack, components of climate control system 100 may be modified and/or replaced without having to remanufacture the entire metal rack. Furthermore, the modular metal rack may be expanded without having to remanufacture the entire metal rack. For example, additional compressors 120 may be added to the metal rack without having to remanufacture the entire metal rack.

FIG. 2A illustrates a frontal view of the example climate control system 100 of FIG. 1 arranged in a modular rack 200. As illustrated in FIG. 2A, climate control system 100 includes flash tank 110, compressors 120, and high side heat exchanger 105. Compressors 120 are located in their own section of rack 200. By arranging climate control system 100 in rack 200, components of system 100 may be modified and/or replaced without having to remanufacture rack 200. For example, the section of rack 200 containing compressors 120 can be expanded to accommodate additional compressors 120 without having to remanufacture the entire rack 200.

In some embodiments, compressors 120 may be added to climate control system 100. The additional compressors may be chained together with the original compressor 120. In this manner, the additional compressors 120 may further compress the refrigerant from the original compressor 120. The additional compressors 120 may send the compressed refrigerant to high side heat exchanger 105. The portion of rack 200 for compressors 120 may be expanded to accommodate the additional compressors. Each of these compressors 120 and the original compressor 120 may be arranged such that they are each accessible and removable through the front of rack 200.

This disclosure contemplates high side heat exchanger 105 coupling, through piping, to a heat removal unit. The heat removal unit may further remove heat from the refrigerant in system 100. The heat removal unit may be located on the exterior of a building or on the ceiling of the building. The heat removal unit may discharge any removed heat into the air outside the building. The heat removal unit may then send the refrigerant to flash tank 110.

In particular embodiments, climate control system 100 may include additional components such as a filter dryer, an oil separator, and an accumulator. The filter dryer may be arranged in space 296 such that the filter dryer is accessible and removable through planar boundary 290. The filter dryer may also be arranged in space 294 such that the filter dryer is accessible and removable through planar boundary 270. The oil separator may be coupled to one or more compressors 120, and the accumulator may be coupled to one or more compressors 120. Both the oil separator and the accumulator may be contained entirely within space 294.

FIG. 2B illustrates a portion of the rack 200 of FIG. 2A for mounting compressors 120. FIG. 2C illustrates a close-up of a portion of the rack 200 of FIG. 2B. As illustrated in FIG. 2B, rack 200 includes metal beams 205 and 210. Metal beams 205 and 210 are customized to allow compressor mounting.

Metal beams 205 and 210 each include a top surface 215 and a bottom surface 220. Each of the top surface 215 and the bottom surface 220 may define multiple cavities 225 and 230 used to mount compressors 120. As illustrated in FIG. 2C, cavities 225 and cavities 230 may be of different shapes. For example, cavities 225 may be circles while cavities 230 are hexagons. Each of the cavities 225 and 230 may be separated by a distance 235. Distance 235 may be substantially the same between all cavities 225 and 230.

Each cavity 230 may be separated from another cavity 230 by a distance 240. Distance 240 is greater than distance 235. Each of distances 240 may be substantially the same. Separating each cavity 230 from another cavity 230 by distance 240 may ensure that there is sufficient space to between mounted compressors 120.

In particular embodiments, the different shapes of cavities 225 and 230 delineate the positions on metal beams 205 and 210 on which compressors 120 are to be mounted. For example, cavities 230 may mark a spot where compressor 120 is to be mounted. Mounting compressors 120 only at cavities 230 may ensure that there is enough space to mount additional compressors of different sizes and/or from different manufacturers. Furthermore, mounting compressors only at cavities 230 may ensure that there is enough space between compressors 120 to access and/or remove each compressor 120. In certain embodiments, cavities 230 are referred to as mounting cavities. Although this disclosure describes mounting compressors only at cavities 230, this disclosure contemplates that the mounting of compressors 120 still involve cavities 225. Cavities 230 are simply reference points from which mounting the compressors 120 takes place. As illustrated in FIGS. 2B and 2C, mounting compressor 120 involves cavities 230 and cavities 225.

In particular embodiments, the cavities defined by top surfaces 215 of metal beams 205 and 210 may line up with the cavities defined by bottom surfaces 220 of metal beams 205 and 210. In this manner, when metal beams 205 and 210 are arranged in a linearly horizontal direction, the cavities 225 and 230 along top surface 215 may correspond to cavities 225 and 230 along bottom surface 220. For example, each cavity 225 along top surface 215 may correspond to another cavity 225 along bottom surface 220, and each cavity 230 along top surface 215 may correspond to another cavity 230 along bottom surface 220. In this manner, a line defined by a cavity 225 or 230 and its corresponding cavity 225 and 230 may be orthogonal to the linearly horizontal arrangement of metal beams 205 and 210.

Compressors 120 may be mounted to metal beams 205 and 210 through mounting brackets 245. Each mounting bracket 245 may couple to compressor 120 and a top surface 215 of metal beams 205 and 210. In particular embodiments, mounting brackets 245 are designed to couple to metal beams 205 and 210 at cavities 225 and 230. Cavities 230 may be used as reference points from which mounting brackets 245 may be coupled to metal beams 205 and 210. Mounting compressors 120 only at cavities 230 may ensure that there is sufficient space between compressors 120 mounted on metal beams 205 and 210.

In particular embodiments, particular fastening devices are used to couple mounting brackets 245 to cavities 225 and 230 of metal beams 205 and 210. Using the illustrated examples of FIGS. 2B and 2C, the fastening devices may be screws or bolts configured to fit a hex cavity 230. The fastening devices may also be screws or bolts configured to fit a circular cavity 225.

FIGS. 2D and 2E illustrate a portion of the rack 200 of FIG. 2A for mounting compressors 120. As illustrated in FIGS. 2D and 2E, compressors 120 may be mounted on metal beams 205 and 250. In particular embodiments, by mounting compressors on metal beams 205 and 250, the section of rack 200 for compressors 120 may be expanded to accommodate any number of compressors 120.

Metal beam 205 may be coupled to metal beam 250 to expand the amount of space available to mount compressors 120. In particular embodiments, metal beam 250 is longer than metal beam 205. Metal beam 205 may be coupled to metal beam 250 in an appropriate manner. For example, metal beams 205 and 250 may include fastening devices that allow metal beam 205 to couple to metal beam 250. Metal beam 250 may define cavities 225 and cavities 230 in the same manner as metal beam 205, described above using FIG. 2B.

In certain embodiments, metal beams 205 and 250 may be configured such that they couple together without affecting the distances 235 and 240 between the cavities of metal beams 205 and 250. For example, after metal beams 205 and 250 are coupled together the right most cavity 225 or 230 of metal beam 205 and the left most cavity 225 or 230 of metal beam 250 may be separated by distance 235. As another example, after metal beams 205 and 250 are coupled together, the right most cavity 230 of metal beam 205 may be separated from the left most cavity 230 of metal beam 250 by distance 240. In this manner, after metal beams 205 and 250 are coupled together they may be visualized as one metal beam of rack 200.

Metal beam 250 may be any appropriate length to accommodate additional compressors 120. As illustrated in FIGS. 2D and 2E, metal beam 250 may be of a length to accommodate one compressor 120 and/or two compressors 120. This disclosure contemplates metal beam 250 being of a length to accommodate any number of compressors 120. In particular embodiments, using metal beam 250 to expand rack 200 allows for compressors 120 to be added to rack 200 without having to remanufacture the entire rack 200. As with metal beam 205, compressors 120 may be mounted to metal beam 250 only at cavities 230 of metal beam 250. In this manner, sufficient space between compressors 120 may be ensured.

FIG. 3 is a flowchart illustrating a method 300 of mounting a compressor to the rack of FIG. 2A. Method 300 may be performed by a person and/or a machine arranging rack 200. In particular embodiments, by performing method 300 additional compressors may be added to the rack without having to remanufacture the entire rack.

In step 305, the person or machine arranges a first metal beam in a linearly horizontal direction. In step 310, the person or machine arranges a second metal beam in a linearly horizontal direction. These two horizontal beams may each define certain cavities on which compressors may be mounted. Some of these cavities may have a different shape from the other cavities. The compressors may be mounted at the different shaped cavities.

In step 315, the person or machine couples a mounting bracket to a top surface of the first metal beam at a first mounting cavity and to a top surface of the second metal beam at a second mounting cavity. The first and second mounting cavities may have different shapes from other cavities along the top surfaces of the first metal beam and the second metal beam. In particular embodiments, mounting compressors only add the mounting cavities of the first and second metal beams may ensure that there is sufficient space between the compressors of the rack.

Modifications, additions, or omissions may be made to method 300 depicted in FIG. 3. Method 300 may include more, fewer, or other steps. For example, steps may be performed in parallel or in any suitable order.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
    a first metal beam arranged in a linearly horizontal direction, the first metal beam defining:
        a plurality of first cavities along a top surface of the first metal beam, each first cavity being of a first shape, each first cavity separated from another first cavity by a first distance;
        a plurality of second cavities along the top surface of the first metal beam, each second cavity being of a second shape different from the first shape, each second cavity separated from another second cavity by a second distance greater than the first distance;
        a plurality of third cavities along a bottom surface of the first metal beam, each third cavity being of the first shape, each third cavity separated from another third cavity by the first distance, each third cavity defining with a first cavity a first line orthogonal to the linearly horizontal direction; and
        a plurality of fourth cavities along the bottom surface of the first metal beam, each fourth cavity being of the second shape, each fourth cavity separated from another fourth cavity by the second distance, each fourth cavity defining with a second cavity a second line orthogonal to the linearly horizontal direction;
    a second metal beam arranged in a linearly horizontal direction, the second metal beam defining:
        a plurality of fifth cavities along a top surface of the second metal beam, each fifth cavity being of the first shape, each fifth cavity separated from another fifth cavity by the first distance; and
        a plurality of sixth cavities along the top surface of the second metal beam, each sixth cavity being of the second shape, each sixth cavity separated from another sixth cavity by the second distance; and
    a mounting bracket configured to couple to the top surface of the first metal beam at a first mounting cavity of the plurality of second cavities and the top surface of the second metal beam at a second mounting cavity of the plurality of sixth cavities, the mounting bracket configured to further couple to a compressor.

2. The apparatus of claim 1, further comprising a second mounting bracket configured to couple to the top surface of the first metal beam at a third mounting cavity of the plurality of second cavities and the top surface of the second metal beam at a fourth mounting cavity of the plurality of sixth cavities, the third mounting cavity separated from the first mounting cavity by the second distance, the fourth mounting cavity separated from the second mounting cavity by the second distance, the second mounting bracket configured to further couple to a second compressor.

3. The apparatus of claim 1, wherein the first metal beam is configured to further couple to a third metal beam, the third metal beam defining a plurality of seventh cavities along a top surface of the third metal beam and a plurality of eighth cavities along the top surface of the third metal beam, wherein:
    each seventh cavity being of the first shape, each seventh cavity is separated from another seventh cavity by the first distance;
    each eighth cavity being of the second shape, each eighth cavity is separated from another eighth cavity by the second distance; and
    an eighth cavity of the plurality of eighth cavities is separated from a second cavity of the plurality of second cavities by the second distance when the third metal beam is coupled to the first metal beam.

4. The apparatus of claim 3, wherein a second mounting bracket is configured to couple to the third metal beam at a third mounting cavity of the plurality of eighth cavities, the second mounting bracket further configured to couple to a second compressor.

5. The apparatus of claim 3, wherein the third metal beam is longer than the first metal beam.

6. An apparatus comprising:
    a first metal beam arranged in a linearly horizontal direction, the first metal beam defining:
        a plurality of first cavities along a top surface of the first metal beam, each first cavity being of a first shape, each first cavity separated from another first cavity by a first distance; and
        a plurality of second cavities along the top surface of the first metal beam, each second cavity being of a second shape different from the first shape, each second cavity separated from another second cavity by a second distance greater than the first distance, the first shape is a circle and the second shape is a hexagon;
    a second metal beam arranged in a linearly horizontal direction, the second metal beam defining:
        a plurality of third cavities along a top surface of the second metal beam, each third cavity being of the first shape, each third cavity separated from another third cavity by the first distance; and
        a plurality of fourth cavities along the top surface of the second metal beam, each fourth cavity being of the second shape, each fourth cavity separated from another fourth cavity by the second distance; and a mounting bracket configured to couple to the top surface of the first metal beam at a first mounting cavity of the plurality of second cavities and the top surface of the second metal beam at a second mounting cavity of the plurality of fourth cavities, the mounting bracket configured to further couple to a compressor.

7. A method comprising:
arranging a first metal beam in a linearly horizontal direction, the first metal beam defining:
  a plurality of first cavities along a top surface of the first metal beam, each first cavity being of a first shape, each first cavity separated from another first cavity by a first distance;
  a plurality of second cavities along the top surface of the first metal beam, each second cavity being of a second shape different from the first shape, each second cavity separated from another second cavity by a second distance greater than the first distance;
  a plurality of third cavities along a bottom surface of the first metal beam, each third cavity being of the first shape, each third cavity separated from another third cavity by the first distance, each third cavity defining with a first cavity a first line orthogonal to the linearly horizontal direction; and
  a plurality of fourth cavities along the bottom surface of the first metal beam, each fourth cavity being of the second shape, each fourth cavity separated from another fourth cavity by the second distance, each fourth cavity defining with a second cavity a second line orthogonal to the linearly horizontal direction;
arranging a second metal beam in a linearly horizontal direction, the second metal beam defining:
  a plurality of fifth cavities along a top surface of the second metal beam, each fifth cavity being of the first shape, each fifth cavity separated from another fifth cavity by the first distance; and
  a plurality of sixth cavities along the top surface of the second metal beam, each sixth cavity being of the second shape, each sixth cavity separated from another sixth cavity by the second distance; and
coupling a mounting bracket to the top surface of the first metal beam at a first mounting cavity of the plurality of second cavities and the top surface of the second metal beam at a second mounting cavity of the plurality of sixth cavities, the mounting bracket configured to further couple to a compressor.

8. The method of claim 7, further comprising coupling a second mounting bracket to the top surface of the first metal beam at a third mounting cavity of the plurality of second cavities and the top surface of the second metal beam at a fourth mounting cavity of the plurality of sixth cavities, the third mounting cavity separated from the first mounting cavity by the second distance, the fourth mounting cavity separated from the second mounting cavity by the second distance, the second mounting bracket configured to further couple to a second compressor.

9. The method of claim 7, wherein the first metal beam is configured to further couple to a third metal beam, the third metal beam defining a plurality of seventh cavities along a top surface of the third metal beam and a plurality of eighth cavities along the top surface of the third metal beam, wherein:
  each seventh cavity being of the first shape, each seventh cavity is separated from another seventh cavity by the first distance;

each eighth cavity being of the second shape, each eighth cavity is separated from another eighth cavity by the second distance; and
an eighth cavity of the plurality of eighth cavities is separated from a second cavity of the plurality of second cavities by the second distance when the third metal beam is coupled to the first metal beam.

10. The method of claim 9, wherein a second mounting bracket is configured to couple to the third metal beam at a third mounting cavity of the plurality of eighth cavities, the second mounting bracket further configured to couple to a second compressor.

11. The method of claim 9, wherein the third metal beam is longer than the first metal beam.

12. A method comprising:
arranging a first metal beam in a linearly horizontal direction, the first metal beam defining:
  a plurality of first cavities along a top surface of the first metal beam, each first cavity being of a first shape, each first cavity separated from another first cavity by a first distance; and
  a plurality of second cavities along the top surface of the first metal beam, each second cavity being of a second shape different from the first shape, each second cavity separated from another second cavity by a second distance greater than the first distance, wherein the first shape is a circle and the second shape is a hexagon;
arranging a second metal beam in a linearly horizontal direction, the second metal beam defining:
  a plurality of third cavities along a top surface of the second metal beam, each third cavity being of the first shape, each third cavity separated from another third cavity by the first distance; and
  a plurality of fourth cavities along the top surface of the second metal beam, each fourth cavity being of the second shape, each fourth cavity separated from another fourth cavity by the second distance; and
coupling a mounting bracket to the top surface of the first metal beam at a first mounting cavity of the plurality of second cavities and the top surface of the second metal beam at a second mounting cavity of the plurality of fourth cavities, the mounting bracket configured to further couple to a compressor.

13. An apparatus comprising:
a first metal beam arranged in a linearly horizontal direction, the first metal beam defining:
  a plurality of first cavities along a top surface of the first metal beam, each first cavity being of a first shape, each first cavity separated from another first cavity by a first distance;
  a plurality of second cavities along the top surface of the first metal beam, each second cavity being of a second shape different from the first shape, each second cavity separated from another second cavity by a second distance greater than the first distance;
  a plurality of third cavities along a bottom surface of the first metal beam, each third cavity being of the first shape, each third cavity separated from another third cavity by the first distance, each third cavity defining with a first cavity a first line orthogonal to the linearly horizontal direction; and
  a plurality of fourth cavities along the bottom surface of the first metal beam, each fourth cavity being of the second shape, each fourth cavity separated from another fourth cavity by the second distance, each fourth cavity defining with a second cavity a second line orthogonal to the linearly horizontal direction; and a mounting bracket configured to couple to the top surface of the first metal beam at a first mounting cavity of the plurality of second cavities, the mounting bracket configured to further couple to a compressor.

14. The apparatus of claim 13, further comprising a second mounting bracket configured to couple to the top surface of the first metal beam at a third mounting cavity of the plurality of second cavities, the third mounting cavity separated from the first mounting cavity by the second distance, the second mounting bracket configured to further couple to a second compressor.

15. The apparatus of claim 13, wherein the first metal beam is configured to further couple to a second metal beam, the second metal beam defining a plurality of fifth cavities along a top surface of the second metal beam and a plurality of sixth cavities along the top surface of the second metal beam, wherein:

each fifth cavity being of the first shape, each fifth cavity is separated from another fifth cavity by the first distance;

each sixth cavity being of the second shape, each sixth cavity is separated from another sixth cavity by the second distance; and a sixth cavity of the plurality of sixth cavities is separated from a second cavity of the plurality of second cavities by the second distance when the third metal beam is coupled to the first metal beam.

16. The apparatus of claim 15, wherein a second mounting bracket is configured to couple to the second metal beam at a third mounting cavity of the plurality of sixth cavities, the second mounting bracket further configured to couple to a second compressor.

17. The apparatus of claim 15, wherein the second metal beam is longer than the first metal beam.

18. An apparatus comprising:
a first metal beam arranged in a linearly horizontal direction, the first metal beam defining:
a plurality of first cavities along a top surface of the first metal beam, each first cavity being of a first shape, each first cavity separated from another first cavity by a first distance; and
a plurality of second cavities along the top surface of the first metal beam, each second cavity being of a second shape different from the first shape, each second cavity separated from another second cavity by a second distance greater than the first distance, wherein the first shape is a circle and the second shape is a hexagon; and
a mounting bracket configured to couple to the top surface of the first metal beam at a first mounting cavity of the plurality of second cavities, the mounting bracket configured to further couple to a compressor.

* * * * *